United States Patent [19]

Lorenz et al.

[11] Patent Number: 4,757,160
[45] Date of Patent: Jul. 12, 1988

[54] CURRENT-CARRYING CONNECTION BETWEEN TWO ELONGATE CONDUCTORS OF AN ELECTRICAL INSTALLATION

[75] Inventors: Dieter Lorenz; Willi Olsen, both of Berlin, Fed. Rep. of Germany

[73] Assignee: Siemens Aktiengesellschaft, Berlin and Munich, Fed. Rep. of Germany

[21] Appl. No.: 772,952

[22] Filed: Sep. 5, 1985

[30] Foreign Application Priority Data

Sep. 11, 1984 [DE] Fed. Rep. of Germany ....... 3433757

[51] Int. Cl.$^4$ ............................................. H01R 11/00
[52] U.S. Cl. .................................. 174/94 S; 174/84 S; 285/417; 403/305; 403/306; 439/794; 439/796
[58] Field of Search ................... 174/21 R, 84 S, 94 S, 174/21 C, 28, 93 R, 127; 285/404, 417; 403/300, 301, 305, 306; 339/14 L, 248 R, 241, 263 R, 272 R; 439/778, 794, 796, 775, 801, 810, 813

[56] References Cited

U.S. PATENT DOCUMENTS

| | | | |
|---|---|---|---|
| 55,198 | 5/1866 | Baum | 403/306 |
| 953,506 | 3/1910 | Baum | 403/300 |
| 2,950,456 | 8/1960 | Rehder | 174/84 S |
| 3,639,671 | 2/1972 | Clark | 174/28 X |
| 3,786,170 | 1/1974 | Floessel | . |
| 4,363,505 | 12/1982 | Smith | . |

FOREIGN PATENT DOCUMENTS

| | | | |
|---|---|---|---|
| 422052 | 11/1925 | Fed. Rep. of Germany | . |
| 2336478 | 2/1974 | Fed. Rep. of Germany | . |
| 1377087 | 9/1964 | France | . |
| 2414656 | 9/1974 | France | 339/272 R |
| 527271 | 10/1940 | United Kingdom | 174/21 R |
| 641193 | 1/1979 | U.S.S.R. | 403/300 |

*Primary Examiner*—Morris H. Nimmo
*Attorney, Agent, or Firm*—Kenyon & Kenyon

[57] ABSTRACT

A current-carrying screw connection between two tubular conductors located in a high-voltage switching installation having a metal encapsulation and insulated with compressed gas comprises radially oriented screws and a tubular shield, the screw heads being disposed inside the wall of the shield. The shield extends in a longitudinal direction over the ends of the two conductors and covers the butt joint between them. The shield is connected to each conductor via screws which are disposed within a region having a maximum circumferential extent of 180°.

18 Claims, 3 Drawing Sheets

CURRENT-CARRYING CONNECTION BETWEEN TWO ELONGATE CONDUCTORS OF AN ELECTRICAL INSTALLATION

BACKGROUND OF THE INVENTION

This invention relates to a current-carrying connection between two elongate conductors of an electrical installation, particularly a high-voltage switching installation with a metal encapsulation and a liquid or gaseous insulating medium having a greater dielectric strength than air at atmospheric pressure.

As described in U.S. Pat. No. 3,786,170, such a current-carrying connection comprises radially oriented screws and a tubular shield, wherein the screw heads are disposed within the shield.

In high-voltage switching installations or high-voltage lines having metal encapsulations and insulated with compressed gas, tubular electrical conductors must be connected to each other in a longitudinal direction and the junction must be shielded dielectrically so that no distortion of the electric field occurs. In known screw connections, the tubular conductors are equipped with angular end pieces surrounded by tubular parts which form the shield with an overlap. The current-carrying connection itself is made by a flexible current-carrying ribbon arranged in the interior of the shield and bolted with radially oriented screws to the respective angular end pieces of the tubular conductors. The screws are disposed completely within the shield formed by the tubular parts. In such screw connections with a current carrying ribbon disposed inside a shield and with separate shielding elements, the shield elements must be connected on one side to the conductors and must be insulated from each other in order to avoid parallel current paths. This structure is disadvantageous with respect to the insulating strength of the system in certain operating states. In the known arrangement, the end pieces are welded to the ends of the conductors. Since the shield does not cover the weld seams, the welds must be made very carefully and subsequently ground to equalize the electric field.

An object of the present invention is to provide an improved connection of two tubular or bar-like conductors of the above-described type.

Another object of the present invention is to provide such a connection which is easy to assemble or form and which can be assembled at construction sites.

Yet another object of the present invention is to provide such a connection which yields a good shielding at the joint.

SUMMARY OF THE INVENTION

The present invention is directed to a current-carrying connection for use in an electrical installation such as a high-voltage switching installation having a metal encapsulation and insulated with compressed gas. In accordance with the invention, the connection comprises a first elongnate hollow conductor having a first end and a second elongate hollow conductor having a second end, the second end being juxtaposed to and facing the first end to form a butt joint between the first conductor and the second conductor. A shield substantially in the form of a sleeve circumferentially surrounds the conductors at the butt joint, the sleeve extending in a longitudinal direction defined by the conductors at the butt joint so that the butt joint is completely covered by the sleeve. A plurality of radially oriented screws fasten the sleeve to the first conductor and to the second conductor. The screws have heads disposed within respective recesses provided in the sleeve and are disposed within a region having a maximum circumferential extent of approximately 180°. Preferably, the screws are disposed in a region having a maximum circumferential extent of 90°.

In accordance with another, more particular, feature of the present invention, the sleeve has a first portion with a first length and a second portion with a second length greater than the first length. The first length is sufficiently large so that the sleeve completely covers the butt joint upon an installation of the sleeve at the butt joint. The second portion of the sleeve is provided with a plurality of bores for receiving the screws to fasten the sleeve to the conductors. The bores are provided with enlarged outer portions for receiving the heads of the screws, the bores with their respective enlarged portions being disposed within the region having a maximum circumferential extent of 180° (preferably, 90°).

In accordance with another particular feature of the present invention, the conductors have different outside diameters and the sleeve has at least two different inside diameters enabling the coupling of the sleeve to conductors.

In accordance with yet another particular feature of the present invention, the sleeve is provided with rounded edges.

Pursuant to further features of the present invention, a reinforcing strip is mounted on an inside surface of one of the hollow tubular conductors, the strip being provided with tapped holes for receiving the screws. A plurality of radially oriented threaded fastening members connect the strip to the hollow tubular conductor, the threaded members each being located between two respective screws. Preferably, the threaded members are disposed in a longitudinally extending linear array.

In a screw connection pursuant to the invention, the tubular shield forms a current-carrying intermediate piece which covers the ends of a pair of tubular conductors in sleeve-like fashion and which receives the radially oriented screws of the connection. Because the heads of the screws are located within the shield or sleeve they do not distort the electric field, but are nevertheless easily accessible from the outside. By the special arrangement of the screws within a circumferential range of maximally 180°, a sufficient number of contact points is provided with certainty between the adjacent cylindrical surfaces of the shield and of the conductors without the need to deform the shield substantially when the screw connection is made. In this way, defined pressure forces of the shield on to the conductor are obtained.

In forming or assembling the screw connection at a construction site, the shield can be used as a plug gauge for the required radial holes. In addition, the conductors need only to be sawed off to the desired length; machining the end faces is not necessary.

The outside diameter of the shielding sleeve is chosen so that the current-carrying capacity of the connection is assured and so that the wall thickness is sufficiently large to receive the screw heads. In addition, conductors with different outside diameters can be connected to each other via the shielding seeve and a possible center offset can be compensated.

The sleeve can have the same length over the entire circumference, i.e., can be a cylindrical sleeve. However, it preferably has shorter lengths in those circumferential ranges which have no screws, so that the sleeve has different lengths along its circumference. Weight and material are saved by such a sleeve structure.

The elongate conductors joined with the current-carrying connection in accordance with the invention may have a solid or a hollow, cylindrical cross section. If the wall thicknesses of hollow conductors to be joined together are relatively small, it may be advisable to provide the separate strip-shaped counter-pieces which have tapped holes for the screws. Such strip pieces can be readily prefabricated in the shop. They are disposed in the interior of the conductors and can be provided with curvatures corresponding to the inside diameters of the conductors.

DETAILED DESCRIPTION

In high-voltage switching installation having a metal encapsulation or housing and insulated with compressed gas such as sulfur hexafluoride ($SF_6$), so-called tubular conductors 1 and 2 exemplarily made of copper or aluminum or alloys thereof are used. These conductors are held by insulators (not shown) spaced from the grounded metal encapsulation (not shown). The conductors are generally joined together at the construction site to form a desired length, which can be several hundred meters.

Figure 1:
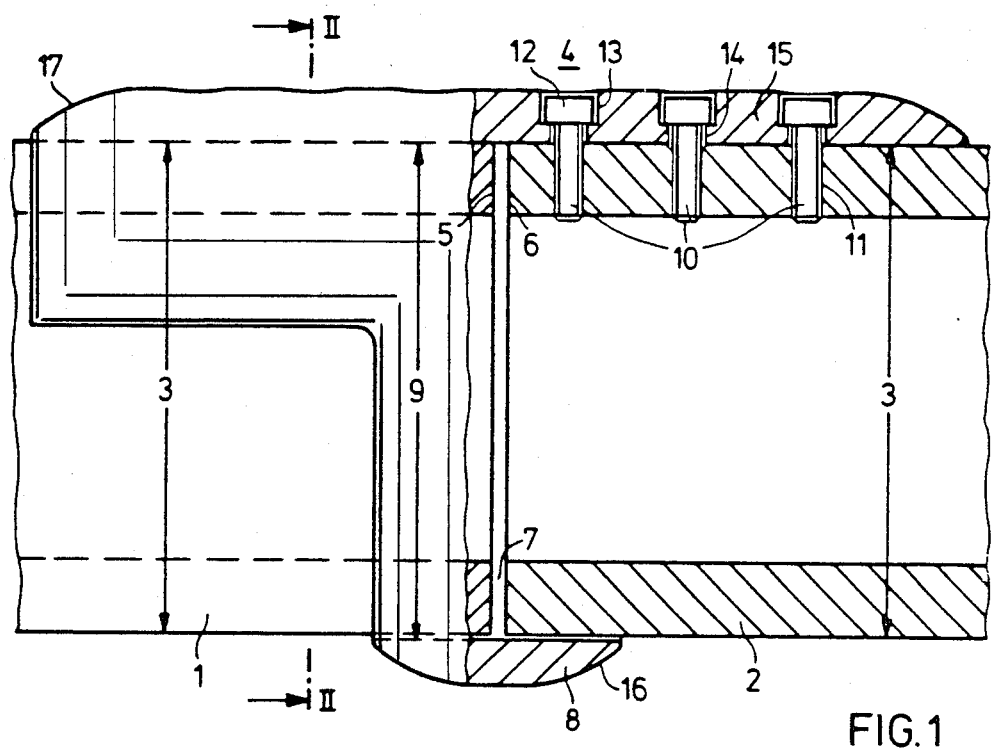
FIG. 1 is a longitudinal cross-sectional view of a current-carrying connection in accordance with the present invention.
Figure 2:
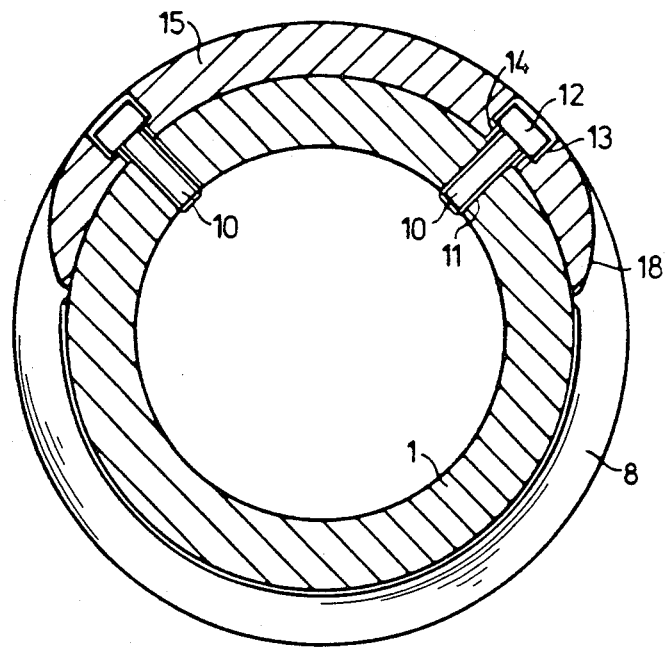
FIG. 2 is a radial or transverse cross-sectional view taken along line II—II in FIG. 1.

A coupling between juxtaposed ends of tubular conductors 1 and 2 is made by means of a current-carrying screw connection 4 according to the invention. As illustrated in FIGS. 1 and 2, tubular conductors 1 and 2 are hollow and have the same outside diameter 3, indicated by arrows. Conductors 1 and 2 are connected to each other via screw connection 4 so current can be transmitted from one tubular conductor over the other. End faces 5 and 6 of conductors 1 and 2 are cut off without machining and are disposed opposite each other with a small spacing to form a butt joint 7. Over both ends of conductors 1 and 2 is slipped a tubular shield 8 in the form of a sleeve having an inside diameter 9 (indicated by arrows) somewhat larger than outside diameter 3 of conductors 1 and 2.

Longitudinal dimension or length of shield 8 is larger in the upper half than in the lower half. In the upper half several screws 10 are arranged in linear arrays extending in the longitudinal direction, shield 8 being fastened to conductors 1 and 2 by the screws. For this purpose, the ends of the conductors 1 and 2 are provided with corresponding tapped holes 11. Screws 10 are disposed in a region having a maximum circumferential range of 180° and preferably 90°. This circumferential range is large enough to provide a sufficient number of contact points between the adjacent cylindrical surfaces of shield 8 ad conductors 1 and 2.

Screws 10 have heads 12 located within shield 8 in counterbores 13 of holes 14 which are deep enough so that screw heads 12 lie within wall 15 of shield 8 and, therefore, cannot cause disadvantageous distortion of the electric field. To further equalize the electric field, all outside edges, e.g., edges 16 and 17, are rounded in the longitudinal direction. The same applies to the outside edge 18 in the circumferential direction and the edges of counterbores 13. To save weight and material, the lengthwise dimension of shield 8 in the lower half is only so large as to provide sufficient shielding of butt joint 7.

Figure 3:
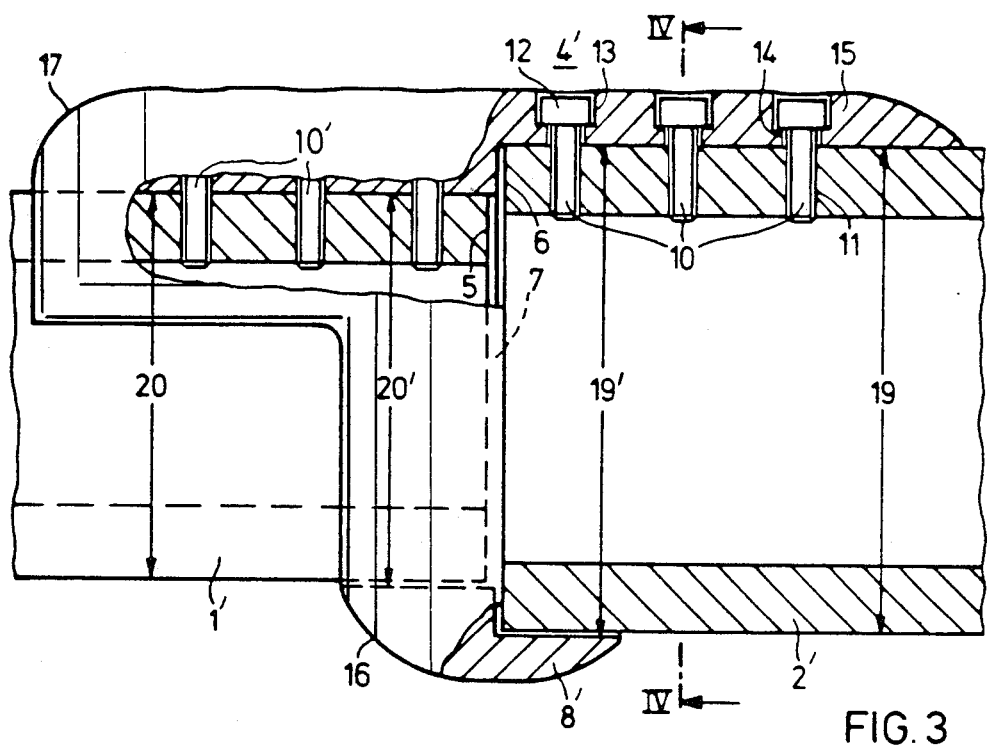
FIG. 3 is a longitudinal cross-sectional view similar to FIG. 1, showing a modified form of the current-carrying connection in accordance with the invention.
Figure 4:
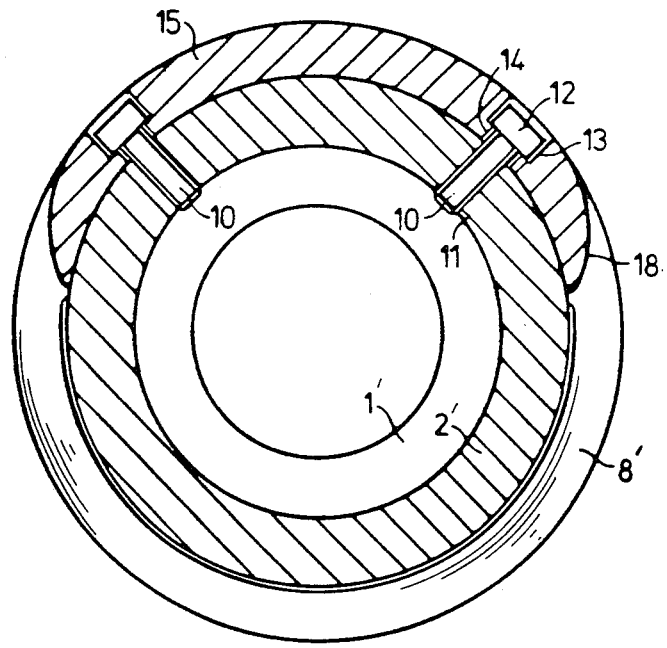
FIG. 4 is a transverse cross-sectional view taken along line IV—IV in FIG. 3.

FIGS. 3 and 4 show a screw connection 4' between two conductors 1' and 2' with different outside diameters 19 and 20. Connection 4' includes a shield 8' having two different inside diameters 19' and 20' slightly larger than outside diameters 19 and 20 and with different longitudinal locations. The wall thickness of shield 8' large enough so that the shield wall can receive, in spite of the diameter difference (19'–20'), the heads 12 of the screws 10. At conductor 1', which has the smaller outside diameter 20, screws 10' are used which have a correspondingly greater length. The dimensions of shield 8' are chosen so that a butt joint 7' between conductors 1' and 2' is approximately in the center of shield 8'.

Figure 5:
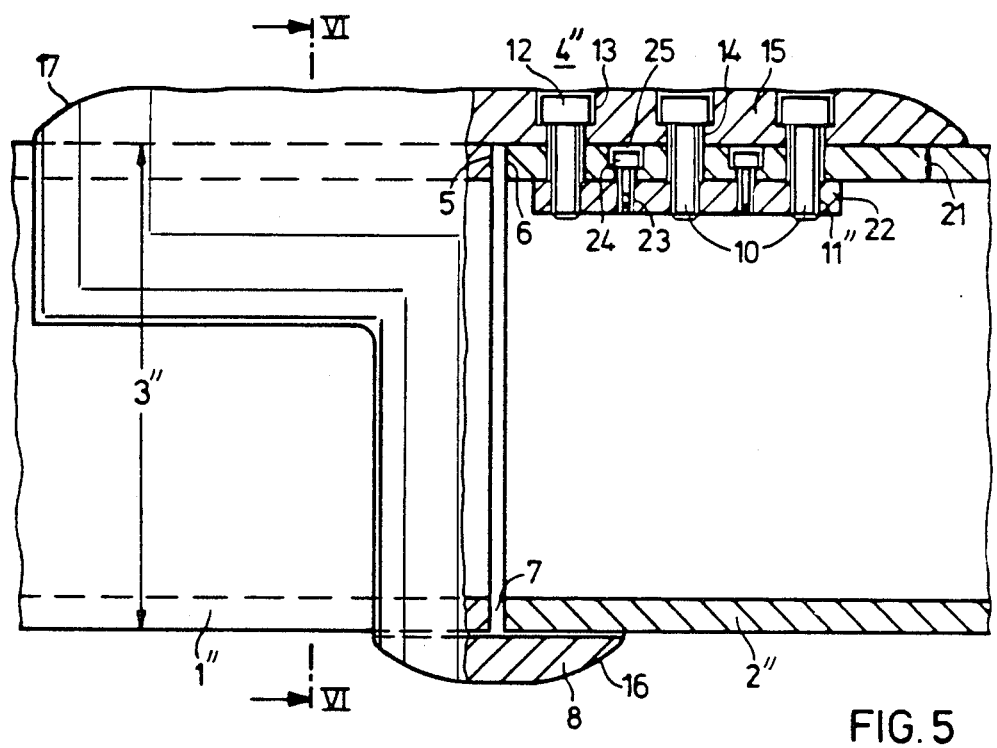
FIG. 5 is a longitudional cross-sectional view similar to FIGS. 1 and 3, showing another modified form of the current-carrying connection in accordance with the invention.
Figure 6:
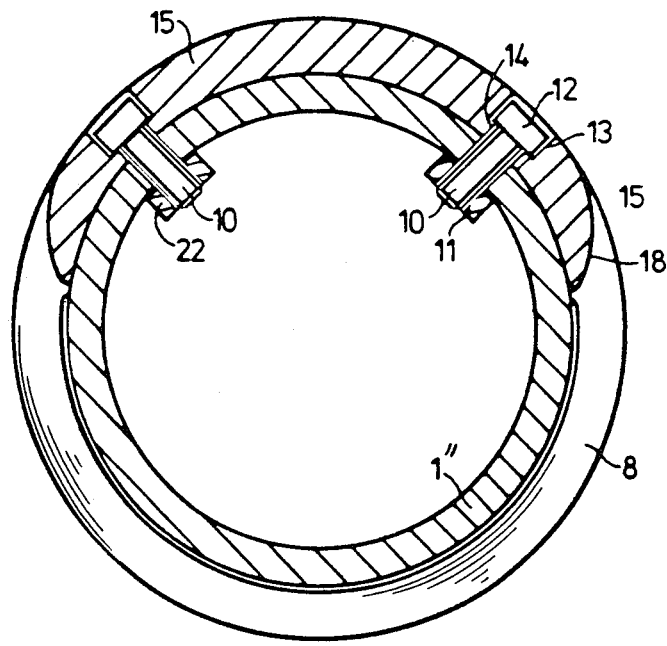
FIG. 6 is a transverse cross-sectional view taken along line VI—VI in FIG. 5.

In FIGS. 5 and 6, a screw connection 4'' between two conductors 1'' and 2'' with the same outside diameter 3'' but a relatively small wall thickness 21 (indicated by a double headed arrow) is shown. Because of the small wall thickness, it cannot be assured that a tapped hole in the conductor wall would provide sufficient strength. For this reason, strip-shaped counter-pieces 22 of a material of greater mechanical strength than conductors 1'' and 2'' are provided which have tapped holes 11'' for the screws 10. These strip-shaped counter-pieces 22 are arranged in the interior of hollow conductors 1'' and 2''. To fasten strip pieces 22 to the conductors, separate threaded members 23 in the form of screws are arranged between screws 10, threaded members 23 having heads which are accommodated on counterbores 25 in conductors 1'' and 2'' in such a manner that the heads do not protrude beyond the outside surfaces of conductors 1'' and 2''.

Although the invention has been described in terms of particular embodiments and applications, one of ordinary skill in the art, in light of this teaching can generate additional embodiments and modifications without departing from the spirit of or exceeding the scope of the claimed invention. Accordingly, it is to be understood that the descriptions and illustrations herein are profferred by way of example to facilitate comprehension of the invention and should not be construed to limit the scope thereof.

What is claimed is:

1. In an electrical installation, particularly a high-voltage switching installation with a metal encapsulation and a compressed-gas insulating medium, a current-carrying connection comprising:
   a first elongate hollow electrical conductor having a first end;

a second elongate hollow electrical conductor having a second end, and second end being juxtaposed to and facing said first end to form a butt joint between said first elongate hollow electrical conductor and said second elongate hollow electrical conductor;

a shield substantially in the form of a sleeve provided with a plurality of outside edges all being rounded, said sleeve circumferentially surrounding said first elongate hollow electrical conductor and said second elongate hollow electrical conductor at said first end and said second end, respectively, said sleeve extending in a longitudinal direction defined by said first elongate hollow electrical conductor and said second elongate hollow electrical conductor at said butt joint so that said butt joint is completely covered by said sleeve, said sleeve being in electrical contact with said first elongate hollow electrical conductor and said second elongate hollow electrical conductor, said sleeve having a circumference and different longitudinal dimensions along said circumference, all circumferential outside edges being rounded in a longitudinal direction and all longitudinal outside edges being rounded in a circumferential direction; and a plurality of radially oriented screws fastening said sleeve to said first elongate hollow electrical conductor and to said second elongate hollow electrical conductor, said screws having heads disposed within respective recesses provided in said sleeve, said screws being disposed within a region having a maximum circumferential extent of 180°.

2. The current-carrying connection according to claim 1 wherein said first elongate hollow electrical conductor and said second elongate hollow electrical conductor have different outside diameters and wherein said sleeve has at least two different inside diameters enabling the coupling of said sleeve to said first elongate hollow electrical conductor and said second elongate hollow electrical conductor.

3. the current-carrying connection according to claim 1 or 2 further comprising a reinforcing strip mounted on an inside surface of one of said first elongate hollow electrical conductor and said second elongate conductor, said strip being provided with tapped holes receiving respective ones of said screws.

4. The current-carrying connection according to claim 3, further comprising a plurality of radially oriented threaded fastening members connecting said strip to said one of said first elongate hollow electrical conductor and said second elongate hollow electrical conductor, said threaded members being located between two respective ones of said screws.

5. The current-carrying connection according to claim 4, wherein said threaded members are disposed in a longitudinally extending linear array.

6. The current-carrying connection according to claim 1 or 2 wherein said screws are disposed in a region having a maximum circumferential extent of 90°.

7. In an electrical installation, particularly a high-voltage switching installation with a metal encapsulation and a compressed-gas insulating medium, a current-carrying connection comprising:
a first elongate hollow electrical conductor having a first end;
a second elongate hollow electrical conductor having a second end, said second end being juxtaposed to and facing said first end to form a butt joint between said first elongate hollow electrical conductor and said second elongate hollow electrical conductor;

a shield substantially in the form of a sleeve, said sleeve being provided with diametric dimensions so that said sleeve can circumferentially surround said first elongate hollow electrical conductor and said second elongate hollow electrical conductor at said butt joint, said sleeve having a first portion with a first length and a second portion with a second length greater than said first length, said first length being sufficiently large so that said sleeve completely covers said butt joint, said second portion of said sleeve being provided with a plurality of bores for receiving screws to fasten said sleeve to said first elongate hollow electrical conductor and to said second elongate hollow electrical conductor, said bores being provided with enlarged outer portions for receiving heads of said screws, said bores with their respective enlarged portions being disposed with a region having a maximum circumferential extent of approximately 180°.

8. The current-carrying connection according to claim 7 wherein said first elongate hollow electrical conductor and said second elongate hollow electrical conductor have different outside diameters and wherein said sleeve has at least two different inside diameters enabling the coupling of said sleeve to said first elongate hollow electrical conductor and said second elongate hollow electrical conductor.

9. The current-carrying connection according to claim 7 or 8 wherein said sleeve is provided with a plurality of outside edges all being rounded, all circumferential outside edges being rounded in a longitudinal direction and all longitudinal outside edges being rounded in a circumferential direction.

10. The current-carrying connection according to claim 7 further comprising a reinforcing strip mountable on an inside surface of one of said first elongate hollow electrical conductor and said second elongate hollow electrical conductor, said strip being provided with tapped holes for receiving respective ones of said screws.

11. The current-carrying connection according to claim 7 or 8 wherein said bores with their enlarged portions are disposed in a region having a maximum circumferential extent of 90°.

12. In an electrical installation, particularly a high-voltage switching installation with a metal encapsulation and a compressed-gas insulating medium, a current-carrying connection comprising:
a first elongate hollow electrical conductor having a first end;
a second elongate hollow electrical conductor having a second end, said second end being juxtaposed to and facing said first end to form a butt joint between said first elongate hollow electrical conductor and said second elongate hollow electrical conductor;
a shield substantially in the form of a sleeve having at least two different axial lengths and at least one outside edge extending at least partially in a longitudinal diection, said sleeve circumferentially surrounding said first elongate hollow electrical conductor and said second elongate hollow electrical conductor at said first end and said second end, respectively, said sleeve extending in a longitudinal direction defined by said first elongate hollow electrical conductor and said second elongate hollow electrical conductor at said butt joint so that said butt joint is completely covered by said sleeve, said sleeve being in electrical contact with said first elongate hollow electrical conductor and said second elongate hollow electrical conductor, said sleeve having a plurality of outside edges, including said one edge, all outside edges of said sleeve being rounded; and a plurality of radially oriented screws fastening said sleeve to said first elongate hollow electrical conductor and to said second elongate hollow electrical conductor, said screws having heads disposed within respective recesses provided in said sleeve, said screws being disposed within a region having a maximum circumferential extent of 180°.

13. The current-carrying connection according to claim 12 wherein said sleeve has a plurality of outside edges extending in a longitudinal direction and a plurality of edges extending in a circumferential direction, all circumferential outside edges being rounded in a longitudinal direction and all longitudinal outside edges being rounded in a circumferential direction.

14. The current-carrying connection according to claim 12 wherein said first elongate hollow electrical conductor and said second elongate hollow electrical conductor have different outside diameters and wherein said sleeve has two different inside diameters enabling the coupling of said sleeve to said first elongate hollow electrical conductor and the said second elongate hollow electrical conductor.

15. The current-carrying connection according to claim 12, further comprising a reinforcing strip mounted on an inside surface of one of said first elongate hollow electrical conductor and said second elongate hollow electrical conductor, said strip being provided with tapped holes receiving respective ones of said screws.

16. The current-carrying connection according to claim 15, further comprising a plurality of radially oriented threaded fastening members connecting said strip to said one of said first elongate hollow electrical conductor and said second elongate hollow electrical conductor, said threaded members being located between two resopective ones of said screws.

17. The current-carrying connection according to claim 16 wherein said threaded members are disposed in a longitudinally extending linear array.

18. The current-carrying connection according to claim 12 wherein said screws are disposed in a region having a maximum circumferential extent of 90°.

* * * * *